US009537796B2

(12) United States Patent
Lisak et al.

(10) Patent No.: US 9,537,796 B2
(45) Date of Patent: Jan. 3, 2017

(54) METHOD AND APPARATUS FOR SUPPORTING A COMMUNICATION SERVICE

(71) Applicant: BlackBerry Limited, Waterloo (CA)

(72) Inventors: Darko Joseph Lisak, Ottawa (CA); Jan Hendrik Lucas Bakker, Fort Worth, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 293 days.

(21) Appl. No.: 13/922,093

(22) Filed: Jun. 19, 2013

(65) Prior Publication Data

US 2014/0376360 A1    Dec. 25, 2014

(51) Int. Cl.
| | | |
|---|---|---|
| *G01R 31/00* | (2006.01) | |
| *H04L 12/939* | (2013.01) | |
| *H04L 29/06* | (2006.01) | |
| *H04W 36/00* | (2009.01) | |
| *H04W 60/00* | (2009.01) | |

(52) U.S. Cl.
CPC ......... *H04L 49/557* (2013.01); *H04L 65/1006* (2013.01); *H04L 65/1016* (2013.01); *H04L 65/1069* (2013.01); *H04L 65/1073* (2013.01); *H04L 65/1083* (2013.01); *H04W 36/0022* (2013.01); *H04W 60/005* (2013.01)

(58) Field of Classification Search
CPC ...... H04L 49/50; H04L 49/501; H04L 49/503; H04L 49/505; H04L 49/55; H04L 49/552; H04L 49/555; H04L 49/557; H04L 12/64; H04L 12/6402
See application file for complete search history.

(56) References Cited

U.S. PATENT DOCUMENTS 6,282,192 B1 * 8/2001 Murphy et al. ............... 370/352
6,868,080 B1 * 3/2005 Umansky et al. ............ 370/354
(Continued)

FOREIGN PATENT DOCUMENTS

| EP | 2184945 | 5/2010 |
| EP | 2515573 | 10/2012 |
| WO | 2012065646 A1 | 5/2012 |

OTHER PUBLICATIONS

European Patent Office, European Search Report issued in connection with European Patent Application 13172895.8, dated Dec. 16, 2013, 11 pages.

(Continued)

*Primary Examiner* — Kevin Mew
(74) *Attorney, Agent, or Firm* — Fish & Richardson P.C.

(57) ABSTRACT

A wireless communication network and a mobile device may support Circuit Switched (CS) and Packet Switched (PS) services. Some types of communication services (e.g. voice, text, data, etc.) may be supported using a CS service or using a PS service. In some embodiments, the PS service is an IMS service using Session Initiation Protocol (SIP) to provide a "CS-like" communication service such as voice or text message. According to the disclosure, a mobile device may detect that it is process data for the PS service. For example, a SIP component that supports the PS service may become inoperable. In response, the mobile device attempts to support the communication service using the CS service.

20 Claims, 12 Drawing Sheets

(56) References Cited

U.S. PATENT DOCUMENTS

| | | | |
|---|---|---|---|
| 7,672,317 B2* | 3/2010 | Gateva | H04L 12/66 370/401 |
| 7,995,466 B2 | 8/2011 | Baker et al. | |
| 7,995,562 B2* | 8/2011 | Purnadi | H04W 36/0022 370/331 |
| 8,223,747 B2* | 7/2012 | Yarlagadda et al. | 370/352 |
| 8,315,623 B1* | 11/2012 | Flynn | H04W 24/04 455/405 |
| 8,451,714 B2* | 5/2013 | Basart et al. | 370/217 |
| 8,570,979 B2* | 10/2013 | Zhao | H04W 24/04 370/331 |
| 8,774,167 B2* | 7/2014 | Tapia et al. | 370/352 |
| 8,817,775 B2* | 8/2014 | Hayama | 370/352 |
| 2005/0060394 A1* | 3/2005 | Frechette | H04L 41/0654 709/223 |
| 2005/0195815 A1* | 9/2005 | Chaudhuri | 370/389 |
| 2006/0209798 A1 | 9/2006 | Oikarinen et al. | |
| 2007/0115946 A1* | 5/2007 | Schaade et al. | 370/356 |
| 2007/0293232 A1* | 12/2007 | Nonaka | H04W 24/00 455/450 |
| 2009/0046655 A1* | 2/2009 | Zhao | H04W 24/04 370/331 |
| 2009/0215404 A1* | 8/2009 | Kesavan | H04W 48/18 455/73 |
| 2010/0027416 A1 | 2/2010 | Beauford | |
| 2010/0202391 A1* | 8/2010 | Palanki | H04W 72/0426 370/329 |
| 2010/0223492 A1 | 9/2010 | Farrugia et al. | |
| 2010/0284267 A1 | 11/2010 | Romero et al. | |
| 2010/0316034 A1* | 12/2010 | Burbidge et al. | 370/338 |
| 2010/0329243 A1* | 12/2010 | Buckley et al. | 370/352 |
| 2011/0002268 A1 | 1/2011 | Dwyer et al. | |
| 2011/0044210 A1* | 2/2011 | Yokota | 370/259 |
| 2011/0211440 A1* | 9/2011 | Arsenault | H04L 41/5054 370/217 |
| 2011/0268023 A1* | 11/2011 | Srinivasan et al. | 370/328 |
| 2011/0276701 A1* | 11/2011 | Purnadi | H04W 36/0022 709/227 |
| 2012/0063302 A1* | 3/2012 | Damnjanovic | H04W 56/0045 370/228 |
| 2012/0176908 A1* | 7/2012 | Lee | 370/241 |
| 2012/0213132 A1 | 8/2012 | Kim et al. | |
| 2012/0320908 A1* | 12/2012 | Silver | H04L 12/66 370/352 |

OTHER PUBLICATIONS

T-Mobile, Voice mode selection for CS Fallback and IMS, 3GPP TSG WG2 Meeting #73, XP-002604555, No. TD S2-093814, May 11-15, 2009, Tallinn, Estonia, 6 pages.

Ericsson, CS domain and IM CN Subsystem selection principles, 3GPP TSG-SA WG2 Meeting #73, XP050415451, S2-094178, May 11-15, 2009, Tallinn, Estonia, 9 pages.

Tanaka et al., CS Fallback Function for Combined LTE and 3G Circuit Switched Services, NTT DOCOMO Technical Journal vol. 11, No. 3, pp. 13-19.

3rd Generation Partnership Project, "Technical Specification Group Core Network and Terminals; Mobile radio interface Layer 3 specification; Core network protocols, Stage 3 (Release 12)," 3GPP TS 24.008 V12.1.0, dated Mar. 15, 2013, 679 pages.

3rd Generation Partnership Project, "Technical Specification Group Services and System Aspects; Circuit Switched (CS) fallback in Evolved Packet System (EPS) Stage 2 (Release 11)," 3GPP TS 23.272 V11.4.0, dated Mar. 7, 2013, 91 pages.

3rd Generation Partnership Project, "Technical Specification Group Services and System Aspects; Architectural requirements (Release 11)," 3GPP TS 23.221 V11.1.0, dated Dec. 18, 2012, 51 pages.

3rd Generation Partnership Project, "Technical Specification Group Core Network and Terminals; 3GPP IMS Management Object (MO); Stage 3 (Release 11)," 3GPP TS 24.167 V11.0.1, dated Dec. 17, 2012, 38 pages.

Communication pursuant to Article 94(3) EPC in European Application No. 13172895.8 issued on Sep. 20, 2016, 6 pages.

* cited by examiner

METHOD AND APPARATUS FOR SUPPORTING A COMMUNICATION SERVICE

FIELD OF THE DISCLOSURE

Aspects of the disclosure relate to methods and apparatuses for supporting a communication service by a mobile device. Specifically, aspects of the disclosure relate to supporting a communication service using a Circuit Switched (CS) service or a Packet Switched (PS) service.

BACKGROUND

A wireless communication network may support Packet Switched (PS) services and/or Circuit Switched (CS) services. Network equipment for a wireless communication network can be divided into access network equipment and core network equipment. An access network and a core network are connected. A single core network can be supported by multiple different access networks. An example of a core network that supports PS services is the Evolved Packet Core (EPC). An example of a core network that supports CS services is the Network Switching Subsystem (NSS) or Global System for Mobile Communications (GSM) core network.

Examples of access networks are: GSM EDGE Radio Access Network (GERAN); Universal Mobile Telecommunications System (UMTS) Terrestrial Radio Access Network (UTRAN); Evolved UTRAN (E-UTRAN); Wireless Local Area Network (WLAN) based access networks, including Institute of Electrical and Electronics Engineers (IEEE) 802.11 networks. GERAN, UTRAN, E-UTRAN are examples of 3rd Generation Partnership Project (3GPP) access networks. WLAN-based access networks (including IEEE 802.11) and 1X CDMA are examples of non-3GPP access networks. Some, but not all, access networks support CS services. Some, but not all, access networks support PS services. E-UTRAN is an example of a 3GPP access network that supports PS services, such as Internet Protocol (IP) Multimedia core network Subsystem (IMS) voice. WLAN networks are examples of non-3GPP access networks that may provide PS services, such as Voice over IP (VoIP) services. GERAN, UTRAN, and 1XCDMA are examples of 3GPP access networks that support CS services. The E-UTRAN and the EPC make up the Evolved Packet System (EPS). The EPS is an evolution of the 3G UMTS characterized by higher-data-rate, lower-latency, packet optimized system that supports multiple Radio Access Technologies (RATs).

The wireless communication network may support one or more communication services for a mobile communication device. Examples of communication services are voice service, text message service, data service, and video service. Examples of these communication services as implemented in a CS domain and delivered to a user by the mobile device are CS voice service, Short Message Service (SMS) and Unstructured Supplementary Service Data (USSD). A communication service may also be supported or realized using a PS service. For example, a same or similar functionality of a CS service (such as a voice service) may be supported using a PS service (such as IMS PS voice or VoIP). Thus, for a given type of communication service (e.g. voice, text, data, etc.) the service may be supported using a "PS-version" or a "CS-version" of the service. IMS PS services may be provided by a 3GPP network. VoIP services may be provided by a WLAN network. IMS and VoIP may utilize the Session Initiation Protocol (SIP).

The mobile device collaborates with the network equipment to support PS and CS services. The mobile device may, for example, utilize SIP components forming part of the mobile device to support PS services provided by the network. A mobile device terminating the SIP protocol can receive and transmit SIP messages configured to support the PS service. Certain SIP request messages request creation of a dialog. For example, a SIP INVITE message is a request for a dialog. When a dialog is created, media may be exchanged between both ends of the dialog. A SIP user agent (UA) terminates a dialog. Voice is an example of media. A SIP dialog that includes voice media can be thought of as a voice call.

BRIEF DESCRIPTION OF THE DRAWINGS

Some aspects of the disclosure will now be described in greater detail with reference to the accompanying diagrams, in which.

DETAILED DESCRIPTION

Figure 1:
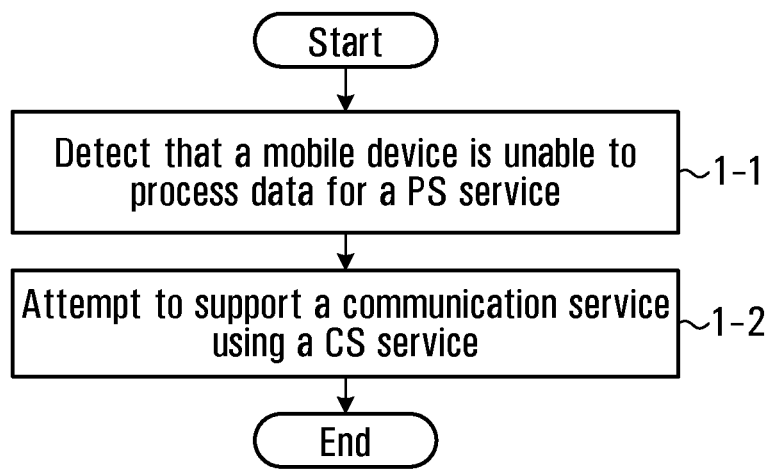
FIG. 1 shows a flowchart of an example method in a mobile device for supporting a communication service according to some embodiments.

According to one aspect, there is provided a method in a mobile device comprising: in respect of a communication service that can be supported using a Packet Switched (PS) service or a Circuit Switched (CS) service: detecting that the mobile device is unable to process data for the PS service; attempting to support the communication service using the CS service.

Optionally, the communication service is one of: a voice service; a text message service; a data service; and a video service.

Optionally, detecting that the mobile device is unable to process the data for the PS service comprises detecting that a component of the mobile device that supports the communication service using the PS service is inoperable.

Optionally, the component that supports the communication service using the PS service comprises an Internet Protocol (IP) Multimedia Core Network Subsystem (IMS) component.

Optionally, the component that supports the communication service using the PS service comprises a Session Initiation Protocol (SIP) component.

Optionally, the method further comprises monitoring the component that supports the communication service using the PS service.

Optionally, monitoring said component that supports the communication service using the PS service comprises at least one of: monitoring a heartbeat message for the component; and monitoring for a signal that indicates failure of the component.

Optionally, detecting that the mobile device is unable to support the communication service using the PS service comprises at least one of: determining that a time in which the heartbeat message for the component has not been received exceeds a threshold; and detecting the signal that indicates failure of the component.

Optionally, said component that supports the communication service using the PS service registers component information, the component information indicating that said component supports the communication service using the PS service.

Optionally, the method further comprises: detecting that the component of the mobile device that supports the PS service has recovered; and attempting to support the communication service using the PS service.

Optionally, attempting to support the communication service using the CS service comprises attempting to register with an access network that can provide the CS service.

Optionally, attempting to register with the access network that can provide the CS service comprises attempting to register with the access network that can provide the CS service if CS Fallback via an Evolved Universal Terrestrial Radio Access Network (E-UTRAN) is not currently available.

Optionally, attempting to support the CS service for the mobile device comprises performing a CS Fallback procedure via an Evolved Universal Terrestrial Radio Access Network (E-UTRAN).

Optionally, the method further comprises generating a message for transmission to set a voice domain preference for the mobile device to one of: CS voice only; CS voice preferred, Internet Protocol (IP) Multimedia Core Network Subsystem (IMS) PS Voice as secondary; and IMS PS voice preferred, CS Voice as secondary.

Optionally, the method further comprises setting a voice over WLAN mode of operation of the mobile device to one of: cellular only; cellular preferred; and WLAN preferred.

Optionally, the communication service is a voice service, and the method further comprises attempting a voice call using one of: a dial string that was used in establishing a Session Initiation Protocol (SIP) dialog; a dial string associated with a SIP Uniform Resource Identifier (URI); and a telephone (tel) URI used when establishing the SIP dialog.

According to another aspect, there is provided a mobile device comprising: a Packet Switched (PS) service support component for supporting a communication service using a PS service; a Circuit Switched (CS) service support component for supporting the communication service using a CS service; and a monitoring module that is configured to detect that the mobile device is unable to process data for the PS service, wherein the CS service support component attempts to support the communication service using the CS service responsive to the monitoring module detecting that the mobile device is unable to process the data for the PS service.

Optionally, the monitoring module is configured to detect that the mobile device is unable to process the data for the PS service by detecting that the PS service support component is inoperable.

Optionally, wherein the PS service support component comprises one of or both: an Internet Protocol (IP) Multimedia Core Network Subsystem (IMS) component; and a Session Initiation Protocol (SIP) component.

Optionally, the monitoring module is configured to monitor the PS service support component.

Optionally, the monitoring module comprises at least one of: a heartbeat monitoring module for monitoring a heartbeat message for the PS service support component; and an error detection module for detecting a signal that indicates failure of the PS service support component.

Optionally, the monitoring module determines that the mobile device is unable to process the data for the PS service if: a time in which the heartbeat message for the PS service support component has not been received exceeding a threshold; or the signal that indicates the failure of the PS service support component is detected.

Optionally, the CS service support component is configured to attempt to support the CS service for the mobile device by attempting to attach to an access network that can provide the CS service.

Optionally, the CS service support component is configured to attempt to support the CS service for the mobile device by initiating a CS Fallback procedure via an Evolved Universal Terrestrial Radio Access Network (E-UTRAN).

Optionally, the apparatus further comprises: a transmitter for transmitting a message to set a voice domain preference for the mobile device to one of: CS voice only; CS voice preferred, Internet Protocol (IP) Multimedia Core Network Subsystem (IMS) PS Voice as secondary; and IMS PS voice preferred, CS Voice as secondary; and a WLAN module for setting a voice over WLAN mode of operation of the mobile device to one of: cellular only; cellular preferred; and WLAN preferred.

According to another aspect, there is provided a computer-readable storage medium having computer-executable instructions stored thereon that, when executed by a computer, cause the computer to implement the method as described above or below.

Other aspects and features of the present disclosure will become apparent, to those ordinarily skilled in the art, upon review of the following description of the specific embodiments of the disclosure.

Some embodiments described herein may be suited for use with Evolved Universal Terrestrial Radio Access (E-UTRA) network although embodiments are not limited to E-UTRA networks.

Some embodiments described herein may be suited for WLAN systems such as IEEE 802.11 systems (such as Wi-Fi™).

It will be appreciated by one skilled in the art that the term mobile device used herein may refer to a mobile station, user equipment (e.g. using an E-UTRA network), or any other mobile wireless device capable of communicating with a wireless network. A network component, as referred to herein, includes an access node. The term access node may refer to a base station (BS), a base node, an evolved base node (eNB), a relay node, or other comparable wireless network radio receiver/transmitter components. In an E-UTRA network, an access node may be an eNB or a relay node. It is to be understood that although some embodiments are described herein as implementing an access node, other embodiments may utilize or be implemented in other network components. The terms mobile device, network component and access node are meant generically and do not limit embodiments to any particular wireless system or specification.

As described above, the network and the mobile device may support CS and PS services. Some types of communication services (e.g. voice, text, data, video, etc.) may be supported or realized using a CS service or with a PS service. In some embodiments described herein, the PS service is an IMS service using SIP to provide a "CS-like" communication service such as voice or text message. However, embodiments are not limited to any particular PS or CS service.

A voice communication service, for example, may be considered a critical service by network operators. Voice communication services are often required to be reliable by (network) operators. Network operators may be reimbursed by their customers for reliably operating the voice service. To a lesser extent, SMS may be considered a critical service. Network operators may be reimbursed for reliably operating the SMS. USSD has been used for pre-paid services, and pre-paid subscribers rely on a service like USSD. Basically, operators have a financial stake in ensuring their services are operable. It is preferable that any components that support communication services that are delivered by the mobile device be operable or that fall back mechanisms exist. Also, mobile device vendors may wish that the users of their mobile devices can receive (i.e. terminate) or make (i.e. originate) voice calls. For example, the mobile device may alert the user to the terminating phone call. Mobile devices that "miss" terminating a voice call may not sell well. However, due to inoperability of any component in the mobile device supporting the PS implementation of a communication service, a mobile device may no longer be able to process data for the PS service. Such device-side issues may, therefore, result in call failures.

FIG. 1 shows a flowchart of an example method in a mobile device for obtaining a communication service, where the communication service can be supported using a PS service or a CS service, according to some embodiments. At block 1-1, the mobile device detects that the mobile device is or has become unable to process data for the PS service.

The PS service may be one of: a voice service; a text message service; a data service; and a video service. However, embodiments are not limited to these particular services and the communication service may comprise other services that may be supported using both a CS service and a PS service. The mobile device may become unable to process data for the PS service because a component of the mobile device that supports the communication service using the PS service (e.g. a SIP component) is or has become inoperable. For simplicity, supporting the communication service using the PS service may be referred to as "supporting the PS service" herein. The component of the mobile device may be a software component or a hardware component or a combination of software and hardware. The component may become inoperable due to a software failure or hardware failure. The mobile device may become unable to process data for the PS service at a time when PS service session was in progress (e.g. during a PS voice call). Embodiments are not limited to any specific method of detecting that the mobile station cannot process data for the PS service. Specific examples of such detection are described below.

At block 1-2, the mobile device attempts to support the communication service using the CS service. For simplicity, supporting the communication service using the CS service may be referred to as "supporting the CS service" herein. Attempting to support the CS service may be performed automatically and/or responsive to detecting that the mobile device isunable to process data for the PS service. In some embodiments, the mobile device may attempt to attach to an access server that can provide the CS service. In other embodiments, the mobile device may attempt to register for CS services via E-UTRAN. For example, the mobile device may become "combined attached" via E-UTRAN and use "CS Fallback (CSFB)" procedures, as discussed below in more detail. In still other embodiments, the mobile device may already be combined attached and may simply initiate CSFB. Some example embodiments of attempting to support the CS service are described herein, and embodiments are not limited to any particular method of attempting to support the CS service.

Figure 2:
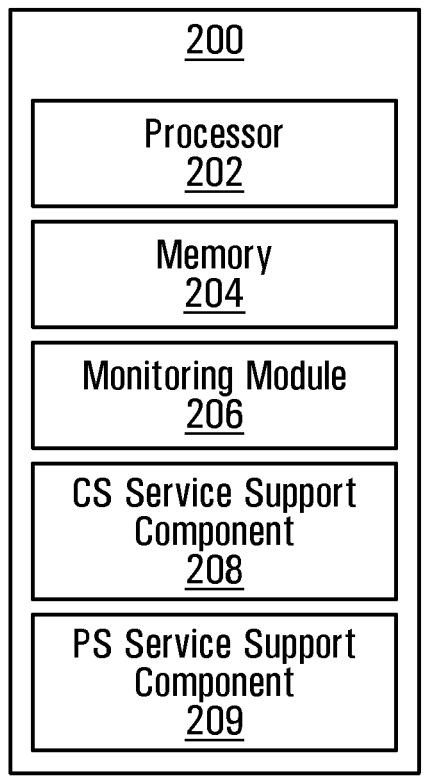
FIG. 2 shows a block diagram of an example apparatus that may implement the method of FIG. 1.

FIG. 2 shows a block diagram of an example apparatus 200 that may implement the method of FIG. 1. The apparatus 200 may be part of the mobile device (not shown). The apparatus 200 includes a processor 202, a memory 204, a monitoring module 206, a CS service support component 208 and a PS service support component 209. The CS service support component 208 is for supporting a communication service using the CS service. The PS service support component 209 is for supporting the communication service using the PS service. Supporting the communication service using the PS service may include processing data for the PS service. The monitoring module 206 detects that the mobile device is or has become unable to process data for the PS service. For example, the monitoring module 206 may detect that the PS service support component 209 is or has become inoperable. The PS service support component 209 may include a SIP component, and the SIP component may become inoperable. The CS service support component 208 attempts to support the CS service responsive to the monitoring module 206 detecting that the mobile device is unable to process the data for the PS service. The CS service support component 208 may interact or work together with other components of the apparatus 200 to attempt to support the CS service. For example, the CS service support component 208 may interact with a transmitter/receiver (not shown) and/or a radio component (not shown) of the mobile device.

The mobile device may have a component called an Operating System (OS), which is also not shown in FIG. 2. The monitoring module 206, the CS service support component 208 and/or the PS service support component 209 may be within the OS or elsewhere on the mobile device.

The monitoring module 206, the CS service support component 208 and/or the PS service support component 209 may be implemented as a processor (such as the processor 202) configured to perform the functions described above. The monitoring module 206, the CS service support component 208 and/or the PS service support component 209 may be implemented as a memory (such as the memory 204) containing instructions for execution by a processor (such as the processor 202), by hardware, or by a combination of instructions stored in a memory and additional hardware, to name a few examples. The apparatus 200 may include additional components, such as a transmitter and/or a receiver, that are not shown in FIG. 2.

As noted above, examples of communication services that may be supported using a PS service or a CS service include: voice; text message; and data service. In some networks, video calls can be also established using the CS network. Some examples of components of the mobile device that support SIP (referred to herein as "SIP components") are a SIP stack, a SIP application, and a SIP User Agent (UA). These SIP components may be used by the mobile device to terminate or originate SIP messages. In some embodiments, detecting that the mobile device is or has become unable to process data for the PS service comprises detecting that a component of the mobile device supporting PS services is or has become inoperable. The component is an IMS component and/or a SIP component in some embodiments. However, the inoperable component may also be a non-IMS and/or a non-SIP component. Examples of non-SIP and non-IMS components (hardware and/or software) that could fail and affect the ability of the mobile device to process data for the PS service include: an IP Packet Protocol component; an RTP Packet Protocol component; a processor; a modem component; an audio Digital Signal Processor (DSP) component; a decoder, encoder and/or codec component. Embodiments are not limited to any particular method of detecting that the mobile device is unable to process data for the PS service.

Figure 3:
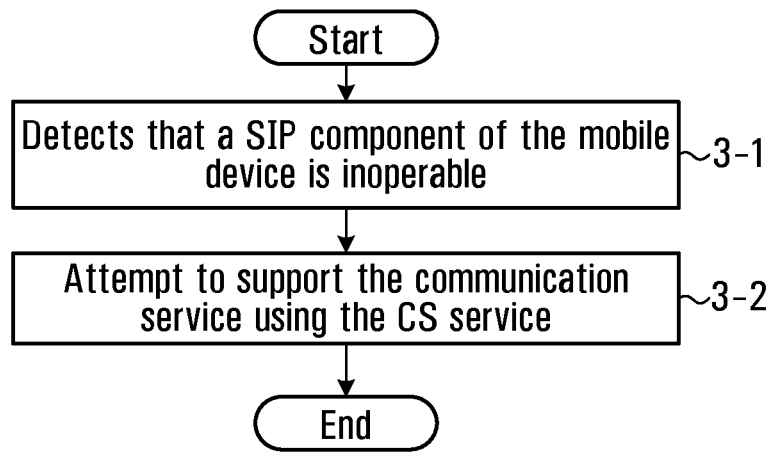
FIG. 3 shows a flowchart of another example method in a mobile device for supporting a communication service according to some embodiments.

FIG. 3 shows a flowchart of an example method in a mobile device for supporting a communication service according to some embodiments. At block 3-1, the mobile device detects that a component of the mobile device that supports the PS service is or has become inoperable. In this example, the component is a SIP component although the component is not required to be a SIP component as discussed above. Since the mobile device has detected that a PS service (e.g. IMS voice service) is no longer supported by the mobile device, the mobile device attempts to support the CS service (e.g. CS voice service) at block 3-2.

Figure 4:
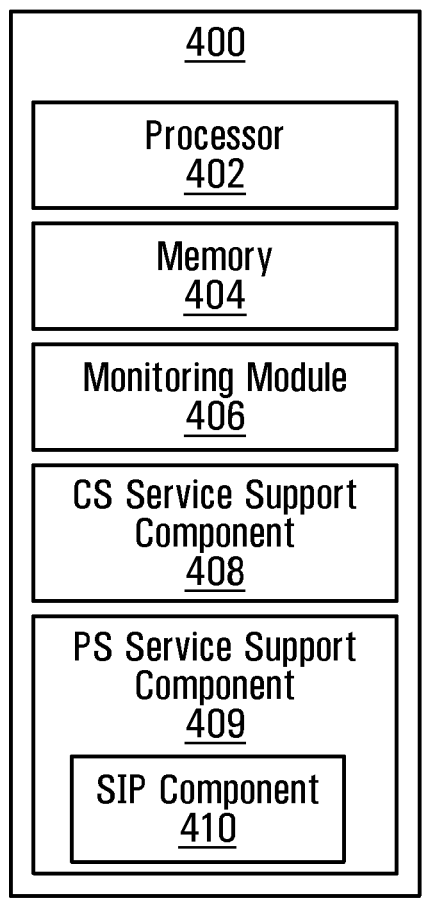
FIG. 4 shows a block diagram of an example apparatus that may implement the method of FIG. 3.

FIG. 4 shows a block diagram of an example apparatus 400 that may implement the method of FIG. 3. The apparatus 400 may be part of the mobile device. The apparatus 400 includes a processor 402, a memory 404, a monitoring module 406, a CS service support component 408, and a PS service support component 409 that includes a SIP component 410. The CS service support component 408 is for supporting a communication service using the CS service. The PS service support component 409 is for supporting the communication service using the PS service. Supporting the communication service using the PS service may include processing data for the PS service. The SIP component 410 in this example supports SIP-based PS services in the mobile device. The SIP component 410 is separate from the PS service support component 409 in some embodiments. The monitoring module 406 detects that the mobile device is or has become unable to process data for the PS service. In this example, the monitoring module 406 monitors the SIP component 410 and is configured to detect if the SIP component 410 is inoperable. In other embodiments, the monitoring module 406 monitors a non-SIP component used to process data for the PS service and detects that the non-SIP component is inoperable. The CS service support component 408 attempts to support the CS service responsive to the monitoring module 406 detecting that the mobile device is unable to process the data for the PS service.

The monitoring module 406, the CS service support component 408 and/or the PS service support component 409 (including the SIP component 410) may be implemented as a processor (such as the processor 402) configured to perform the functions described above. The monitoring module 406, the CS service support component 408 and/or the PS service support component 409 may be implemented as a memory (such as the memory 404) containing instructions for execution by a processor (such as the processor 402), by hardware, or by a combination of instructions stored in a memory and additional hardware, to name a few examples. The apparatus 400 may include additional components, such as a transmitter and/or a receiver, that are not shown in FIG. 4.

Figure 5:
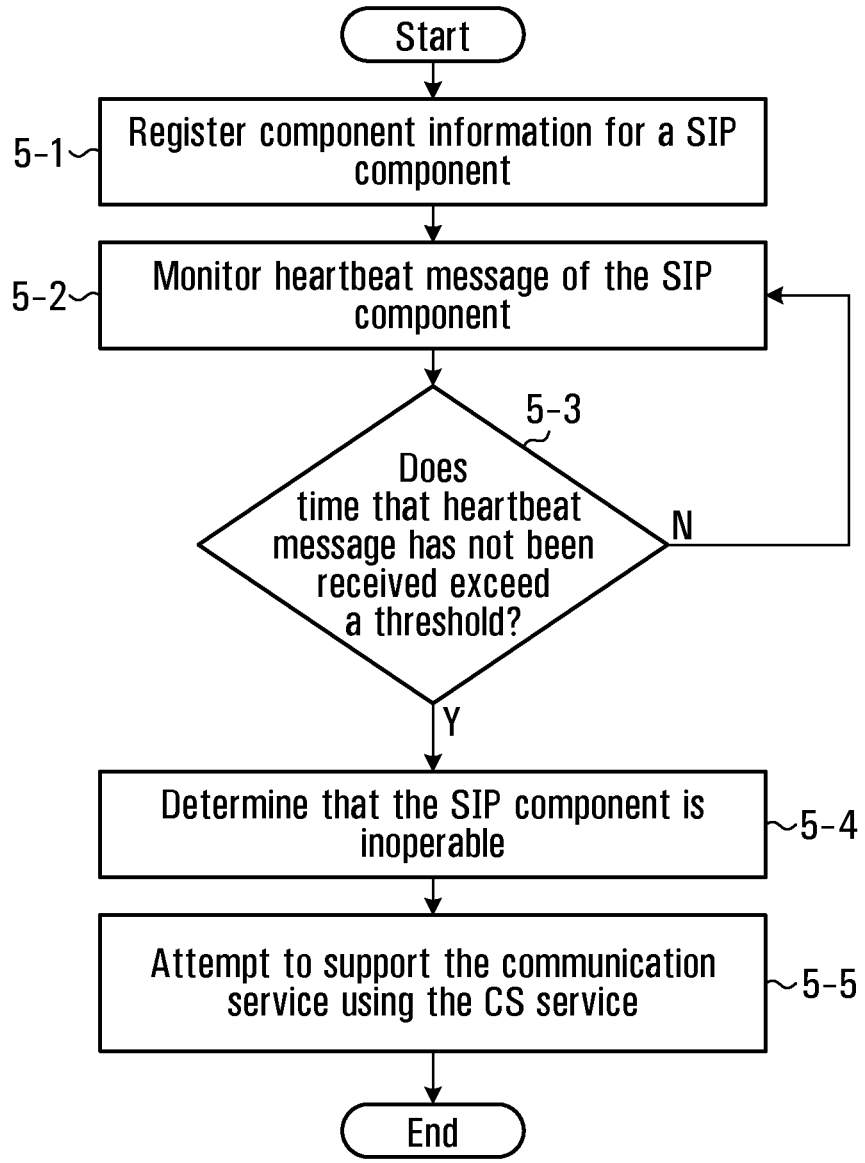
FIG. 5 shows a flowchart of an example method showing additional details regarding how inoperability of a SIP component may be detected in some embodiments.

FIG. 5 shows a flowchart of another example method showing additional details regarding how inoperability of a component supporting the PS service may be detected. The component in this example is a SIP component, although non-SIP components are monitored in other embodiments. At block 5-1, the SIP component registers component information (for example, as part of a registration process for the SIP component). For example, the SIP component may perform a registration process in which the component information is registered with a monitoring component of the mobile device. The component information for the SIP component may indicate that the SIP component supports the PS service. The monitoring component may thereby be aware that the SIP component needs to be monitored. The monitoring component will also, then, know that if the SIP component is determined to be inoperable, data for the PS service can no longer be processed. Registration of one or more components is not required in some embodiments. In some embodiments, more than one component registers respective component information and/or more than one component is monitored.

At block 5-2 the mobile device monitors the component that supports the PS service, the SIP component in this example. However, the monitoring functions shown in FIG. 5 may also be performed in embodiments where the component supporting the PS service is a non-SIP component. Specifically, in this example, a "heartbeat message" for the SIP component is monitored.

A heartbeat message is a message that may be periodically transmitted from a component (the SIP component in this example). If the heartbeat message is not received within a threshold time the component may be deemed inoperable. In FIG. 5, at block 5-3, if a time in which the heartbeat message for the SIP component has not been received exceeds a threshold (yes branch block 5-3), then the SIP component is determined to be inoperable at block 5-4. If a time in which the heartbeat message for the SIP component has not been received has not exceeded the threshold (no branch block 5-3), then the method returns to block 5-2 such that continued monitoring takes place.

At block 5-5, since the SIP component has been determined to be inoperable, and the PS service cannot be supported, the mobile device attempts to support the CS service. In other words, if a monitoring component of the mobile device is satisfied that a SIP component's operation to support a PS service is sufficiently impaired (e.g. due to detecting indicators or time bound violations for heartbeat responses), the mobile device may initiate attempts to restore the communication service by supporting the CS service. The CS service may be supported via other domains (e.g. CS domain) and/or via other access networks.

Figure 6:
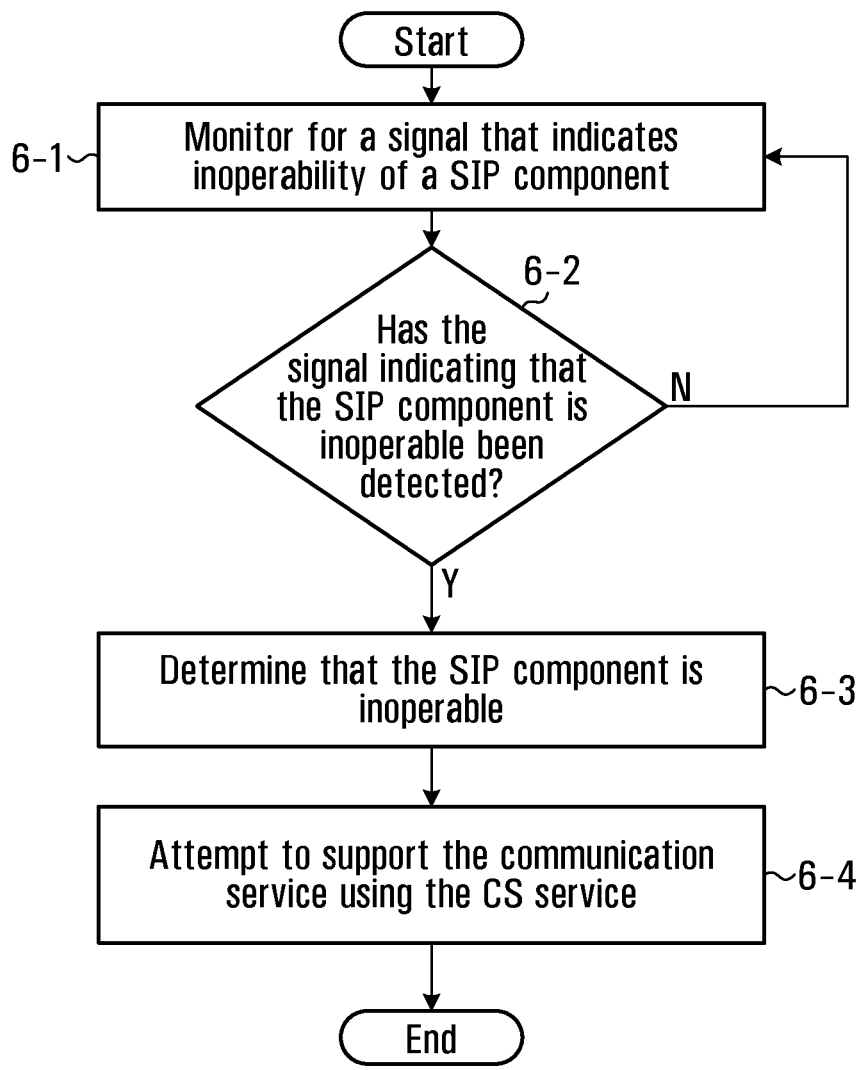
FIG. 6 shows a flowchart of another example method showing additional details regarding how inoperability of the SIP component may be detected in some embodiments.

FIG. 6 shows a flowchart of another example method showing additional details regarding how inoperability of a component may be detected. The component in this example is a SIP component, but the component is a non-SIP component in some embodiments. The SIP component may register component information as discussed with respect to block 5-1 of FIG. 5, although that is not required. At block 6-1 the mobile device monitors the component that supports the PS service. Specifically, in this example, the mobile device monitors for a signal that indicates inoperability (e.g. failure) of the SIP component. The mobile device may know to monitor the SIP component due to component information registered by the SIP component, as explained with respect to FIG. 5. Signals that indicate inoperability of non-SIP components may be monitored as well.

The SIP component may be the SIP stack, the SIP application or the SIP UA, for example. An example of a monitoring component that may be configured to monitor a SIP component is a SIP stack monitor. The signals monitored may be Portable Operating System Interface (POSIX) signals or other signals defined in existing standards or operating systems. The signals may be signals that are transmitted to or from the component supporting the PS service. By monitoring such predefined signals, additional signalling may not need to be created or monitored in the mobile device. This may reduce the complexity of or otherwise facilitate implementing the monitoring functions described herein. Examples of POSIX signals that may, upon detection, indicate inoperability of a SIP component include the following; abort (SIGABRT); bus error (SIGBUS); floating point error (SIGFPE); illegal instruction (SIGILL); quit (SIGQUIT); segmentation violation (SIGSEGV); bad arg to sys call (SIGSYS); exceeded CPU limit (SIGXCPU); exceeded file size limit (SIGXFSZ); and power-fail restart (SIGPWR). Other signals may also, when detected, indicate that a SIP component or another component that supports PS services is inoperable. Embodiments are not limited to any particular method of detecting inoperability of a component of the mobile device.

At block 6-2, if the signal indicating that the SIP component is inoperable is detected (yes branch, block 6-2) then the SIP component is determined to be inoperable at block 6-3. At block 6-4, since the SIP component has been determined to be inoperable, the mobile device attempts to support the CS service similar to block 5-5 in FIG. 5. If no signal indicating that the SIP component is inoperable has been detected (no branch, block 6-2), then the method proceeds back to block 6-1 for continued monitoring of the SIP component.

In some embodiments the method includes both: (1) monitoring a heartbeat message (for example, as shown in FIGS. 5); and (2) monitoring/detecting a signal that indicates inoperability of a component that supports the PS service (for example, as shown in FIG. 6). However, the specific monitoring functions shown in FIGS. 5 and 6 are not required. Additional monitoring/detecting functions not shown in FIGS. 5 and 6 may be performed. Any suitable method of detecting that the mobile device is unable to process data for the PS service may be employed.

Figure 7:
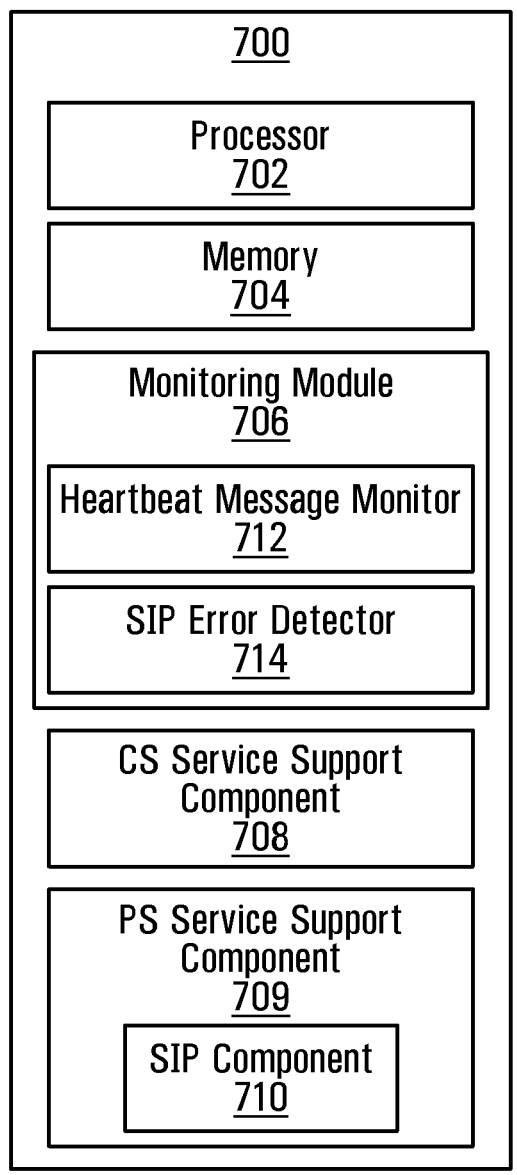
FIG. 7 shows a block diagram of an example apparatus that may implement the methods of FIGS. 5 and 6.

FIG. 7 shows a block diagram of an example apparatus 700 that may implement the methods of FIGS. 5 and 6. The apparatus 700 may be part of the mobile device. The apparatus 700 includes a processor 702, a memory 704, a monitoring module 706, a CS service support component 708 and a PS service support component 709 that includes a SIP component 710. The CS service support component 708 is for supporting a communication service using the CS service. The PS service support component 709 is for supporting the communication service using the PS service.

Supporting the communication service using the PS service may include processing data for the PS service. The SIP component 710 is separate from the PS service support component 709 in some embodiments.

The monitoring module 706, in this example, includes both a heartbeat message monitor 712 and a SIP error detector 714. The SIP component 710 is similar to the SIP component 410 shown in FIG. 4. The SIP component may register component information that indicates that the SIP component supports the PS service. The heartbeat message monitor 712 monitors a heartbeat message of the SIP component 710. If the heartbeat message is not received for a time that exceeds a threshold, then the monitoring module 706 determines that the SIP component 710 is or has become inoperable. The SIP error detector 714 may include a SIP stack monitor (not shown). The SIP error detector 714 monitors for one or more signals that indicate that the SIP component 710 is inoperable. The signals may, for example, be any of the POSIX signals described above or other suitable signals. Upon detection of such a signal, the monitoring module 706 determines that the SIP component 710 is inoperable. The CS service support component 708 attempts to support the CS service if the SIP component 710 is determined to be inoperable (i.e. responsive to the monitoring module 706 detecting that the mobile device is unable to process data for the PS service).

The monitoring module 706 (including the heartbeat message monitor 712 and the SIP error detector 714), the CS service support component 708 and/or the PS service support component 709 (including the SIP component 710) may be implemented as a processor (such as the processor 702) configured to perform the functions described above. The monitoring module 706, the CS service support component 708 and/or the PS service support component 709 may be implemented as a memory (such as the memory 704) containing instructions for execution by a processor (such as the processor 702), by hardware, or by a combination of instructions stored in a memory and additional hardware, to name a few examples.

The heartbeat message monitor 712 and the SIP error detector 714 are shown as part of the monitoring module 706 in this example. However, it is possible that either or both of the heartbeat message monitor 712 and the SIP error detector 714 may be separate from and/or external to the monitoring module 706. It will also be appreciated that the apparatus 700 may include additional components, such as a transmitter and/or a receiver, that are not shown in FIG. 7.

Various examples of methods and apparatuses for attempting to support the CS service (see block 1-2 of FIG. 1) are discussed in more detail below with reference to FIGS. 8 to 13. However, before turning to these specific examples, a brief discussion is provided below regarding 3GPP services, non-3GPP services and E-UTRAN CS Fallback (CSFB).

As described above, PS and CS services may be supported in a 3GPP network or in a non-3GPP network. For example, PS services may be supported in the 3GPP domain with E-UTRAN as the access network and the EPC core network. Other 3GPP access networks (GERAN, UTRAN, etc.) may support CS services such as CS voice, SMS or USSD. 3GPP networks may be commonly be referred to as "cellular" networks.

A mobile device supporting WLAN services, such as VoIP, may maintain a "voice over WLAN" setting that can be set to one of the following: "cellular only"; "cellular preferred"; "WLAN preferred"; and "WLAN only". For "cellular only", the mobile device uses only cellular networks. For "cellular preferred", the mobile device uses cellular networks if available, and otherwise uses a WLAN connection. For "WLAN preferred", the mobile device uses a WLAN network if available, and otherwise uses cellular networks. For "WLAN only", the mobile device only uses a WLAN connection.

E-UTRAN may allow a mobile device to be registered for both PS services and CS services. A mobile device that is registered for both PS and CS services (for example, using E-UTRAN registration information of the mobile device is provisioned in the CS network's core network and the EPC network) may be referred to as being "combined attached". The access network may be supported by a core network that supports PS services and also "CS Fallback" (CSFB).

If supported by the core network, the access network (e.g. E-UTRAN) can then offer a CSFB feature for the mobile device. CSFB may allow a combined attached mobile device to quickly select and switch between PS and CS services as needed or preferred. The CS services may be offered by a different access network. When combined attached, the mobile device may be registered both in the core network supporting PS services (e.g. an EPC supporting EPS services) and a core network offering CS services (e.g. non-EPS services). As described in 3GPP TS 23.272 version 11.4.0 Release 11, CSFB in EPS may be realized by using the SGs interface mechanism between a Mobile Switching Centre (MSC) Server and a Mobility Management Entity (MME).

As an example of when CSFB may be utilized, a mobile device that is combined attached via E-UTRAN may use PS services for data communication and CS services for voice calls. Upon detecting that a voice call is required, the mobile device (currently using PS services) may use the CSFB procedure to quickly switch to the CS domain and support the CS voice service. Through the CSFB procedure, the mobile device may terminate or originate the voice call via the core network in which it is registered for CS services and via an access network that offers CS services. As an example, when the mobile device needs to terminate a CS call, the CSFB procedure may include the MSC providing a priority indication together with a paging message to the MME. The network may initiate a handover from the E-UTRAN and EPC to the access network and/or core network that support the CS service. As another example, when the mobile device is to originate a CS call, the mobile device may send an Extended Service Request for mobile originating CSFB to the MME. The MME may then send a message to a base station indicating that the mobile device should be moved to the access network that supports the CS service (e.g. GERAN or UTRAN). Additional details regarding CSFB are provided in the 3GPP TS 23.272 version 11.4.0 Release 11 specification document, the entire contents of which are incorporated herein by reference.

The E-UTRAN may maintain a "usage setting" for the mobile device with the following options: "Data Centric"; and "Voice Centric". The E-UTRAN may also maintain a "voice domain preference" setting for the mobile device. The network may use the mobile device's usage setting and the "voice domain preference" for E-UTRAN to select the Radio Access Technology (RAT)/Frequency Selection Priority (RFSP) index. The mobile device may transmit messages to the network to update and/or change the "usage setting" or the "voice domain preference" setting for the mobile device. The "voice domain preference" may have the following options: "CS voice only"; "IMS PS voice only"; "CS voice preferred, IMS PS voice as secondary"; and "IMS PS voice preferred, CS voice as secondary". More information regarding the usage setting for a mobile device may be found, for example, in the 3GPP TS 23.221 version 11.1.0 specification document, the entire contents of which is incorporated herein by reference. More information regarding voice domain preference settings may be found, for example, in the 3GPP TS 24.167 version 11.1.0 specification document, the entire contents of which is incorporated herein by reference.

Updating the "voice over WLAN" mode of operation or generating a message to update the "voice domain preference" for E-UTRAN are examples of how a mobile device may update communication setting information for the mobile device.

The mobile device's usage setting indicates the value configured on the mobile device as defined in 3GPP TS 23.221. A voice domain preference for E-UTRAN information indicates the value configured on the mobile device of the "voice domain preference" for E-UTRAN as defined in 3GPP TS 24.167. The mobile device may indicate the "voice domain preference" information to the network in a message. For example, the "voice domain preference" information can be indicated to the network when the "voice domain preference" changes. Also a usage setting information element may be included in the message; the usage setting information element may define the usage setting for the mobile device. An example of how the mobile device's usage setting information element is coded is shown in Table 10.5.151A of the 3GPP TS 24.008 version 12.1.0 specification document, which is shown below. The entire contents of the 3GPP TS 24.008 version 12.1.0 specification document is incorporated herein by reference.

TABLE 10.5.151A/3GPP TS 24.008: Voice domain preference and UE's usage setting information element

| 8 | 7 | 6 | 5 | 4 | 3 | 2 | 1 | |
|---|---|---|---|---|---|---|---|---|
| Voice domain preference and UE's usage setting \|E\| | | | | | | | | octet 1 |
| Length of Voice domain preference and UE's usage setting contents | | | | | | | | octet 2 |
| 0 Spare | 0 Spare | 0 Spare | 0 Spare | 0 Spare | UE's usage setting | Voice domain preference for E-UTRAN | | octet 3 |

An example of how the "voice domain preference" information for a mobile device is coded is shown in Table 10.5.166 A of the 3GPP TS 24.008 version 12.1.0 specification document, which is shown below.

TABLE 10.5.166A

3GPP TS 24.008: Voice domain preference and UE's usage setting information element Voice domain preference and UE's usage setting value (octet 3, bit 1 to 3)
UE's usage setting (1 bit field)

Bit

| 3 | |
|---|---|
| 0 | Voice centric |
| 1 | Data centric |

Voice domain preference for E-UTRAN (2 bit field)

Bit

| 2 1 | |
|---|---|
| 0 0 | CS Voice only |
| 0 1 | IMS PS Voice only |
| 1 0 | CS voice preferred, IMS PS Voice as secondary |
| 1 1 | IMS PS voice preferred, CS Voice as secondary |

MS not supporting IMS voice shall indicate "CS Voice only".
MS only supporting IMS voice shall indicate "IMS PS Voice only".

Figure 8:
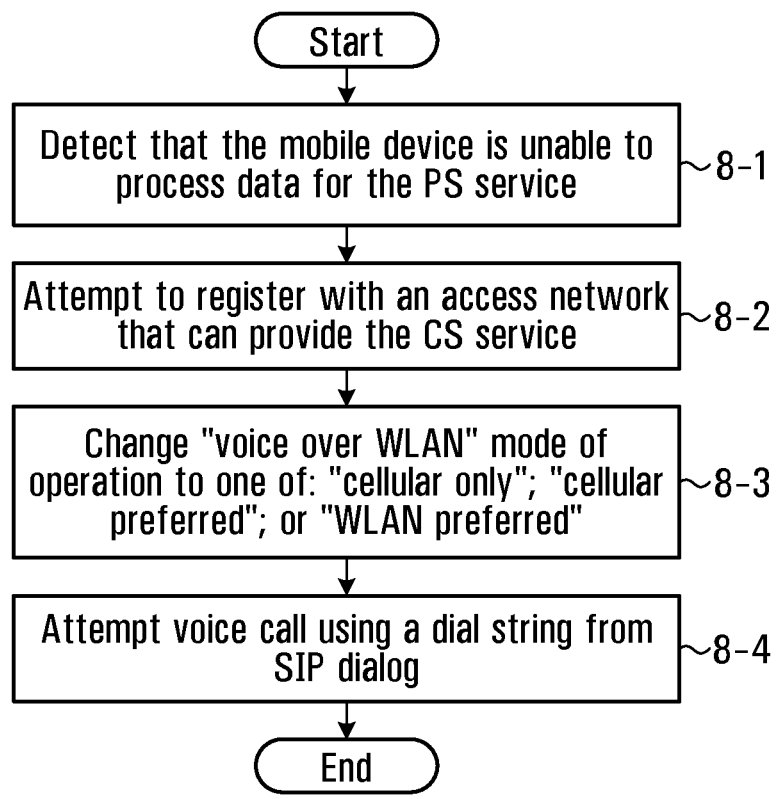
FIG. 8 shows a flowchart of another example method for supporting a communication service according to some embodiments.

FIG. 8 shows a flowchart of an example method for supporting a communication service according to some embodiments, where the communication service can be supported using a PS service or using a CS service. At block 8-1, the mobile device detects that the mobile device is or has become unable to process data for the PS service. This detection may include any of the specifics discussed above with respect to FIGS. 1 to 7. The PS service may be provided by a WLAN network (e.g. VoIP) or by a 3GPP network (e.g. IMS voice). In this example, however, the PS service is VoIP provided by a WLAN network. At block 8-2, the mobile device attempts to register with an access network that can provide the CS service (such as GERAN, UTRAN or 1XCDMA, for example). The mobile device may thereby attempt to attach to a CS core network via the access network and support the CS service. In some embodiments, the mobile device attempts to attach to an access network that can provide the CS service (block 8-2) if the mobile device is not already attached to such an access network. In some embodiments, the mobile device attempts to attach to an access network that can provide the CS service (block 8-2) if: (1) the mobile device is not already combined attached via E-UTRAN; or (2) the mobile device is combined attached, but not in a manner that allows CSFB to be attempted for the communication service. For example, the mobile device may be combined attached for SMS only and CSFB may not be available for a voice call. The mobile device may then attempt to attach to a different access network that could support a CS voice call.

At block 8-3, the mobile device updates its communication setting information by changing or setting its "voice over WLAN" mode of operation to one of: "cellular only"; "cellular preferred"; or "WLAN preferred". Each of these settings may permit the mobile device to use cellular services (e.g. the CS service as provided by a 3GPP network). In some embodiments, the mode of operation is changed to "cellular only". In other embodiments, block 8-3 is omitted. The mobile device may not change its "voice over WLAN" mode of operation. For example, the preference may already be set to one of the options set out above or the setting may otherwise not be changed. In some embodiments, the mobile device may also generate a message to change or set its "voice domain preference" as described, for example, in FIG. 10.

Since the mobile device itself has detected that it is unable to support the WLAN PS service, the network may not be aware of this. Therefore, the network may not have any reason to signal to the mobile device to change its "voice over WLAN" mode of operation. However, the current mode of operation may not allow the mobile device to use the CS service efficiently or at all. For example, the mode of operation could be set to "WLAN only" when the SIP component becomes inoperable. Thus, the mobile device may actively update the "voice over WLAN" mode of operation itself as described above rather than wait for the network to signal that it should do so.

In some embodiments, if the mobile device was terminating a PS voice session (i.e. voice call) when the mobile device detected that PS services are no longer supported, the mobile device may use information or settings associated with the PS voice session when establishing a CS voice session. For example, a dial string used for the PS voice session may be used to establish the CS voice session. In some embodiments, attempting to support the CS service includes attempting a voice call. In the embodiment of FIG. 8, at block 8-4, information used in the PS voice session is used to attempt to establish a new CS voice session using the CS service. Specifically, in this example, the voice call is attempted using a dial string from the SIP dialog. The dial string may be one of: a dial string that was used in establishing a Session Initiation Protocol (SIP) dialog; a dial string associated with a SIP Uniform Resource Identifier (URI); and a telephone (tel) URI used when establishing the SIP dialog. The dial string may, for example, be encoded in the Request-URI (R-URI) field of the SIP INVITE that was used to request the SIP dialog. It is not necessary to use a dial string from a SIP dialog or to attempt to establish a voice call and block 8-4 is not required in some embodiments.

Figure 9:
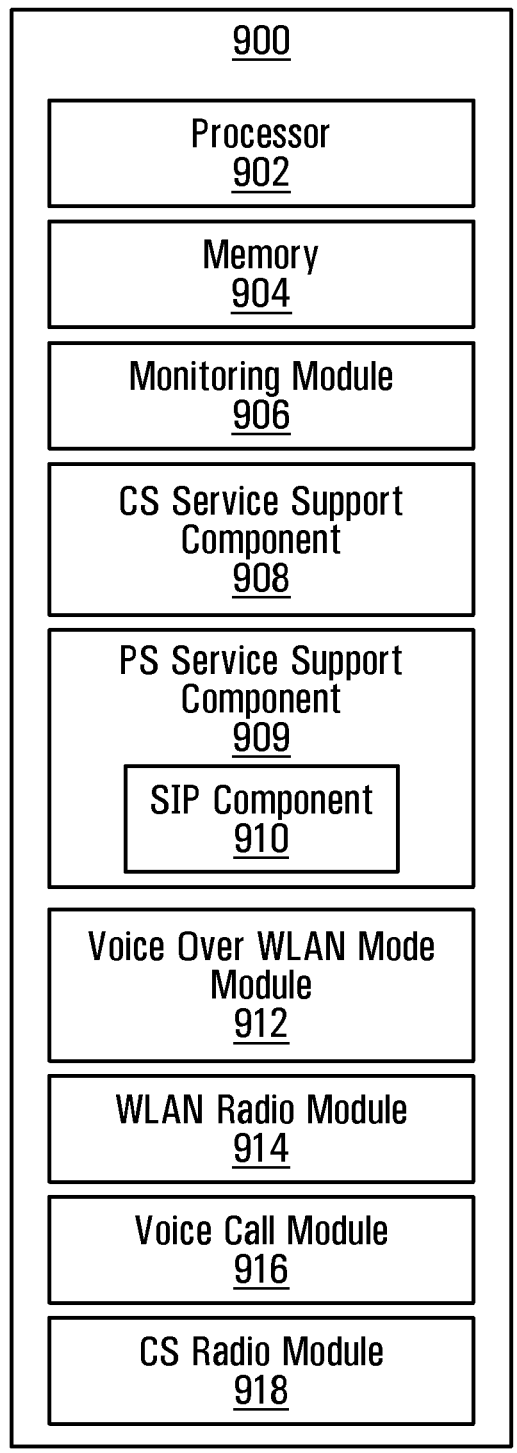
FIG. 9 shows a block diagram of an example apparatus that may implement the method of FIG. 8.

FIG. 9 shows a block diagram of an example apparatus 900 that may implement the method of FIG. 8. The apparatus 900 may be part of the mobile device. The apparatus 900 includes a processor 902, a memory 904, a monitoring module 906, a CS service support component 908, a PS service support component 909 that includes a SIP component 910, a voice over WLAN mode module 912, a WLAN radio module 914, a voice call module 916, and a CS radio module 918. The CS service support component 908 is for supporting a communication service using the CS service. The PS service support component 909 is for supporting the communication service using the PS service. Supporting the communication service using the PS service may include processing data for the PS service. The SIP component 910 is separate from the PS service support component 909, or may be omitted, in some embodiments. The SIP component 910 supports the PS service, which is a WLAN voice service in this embodiment. The PS service support component 909 may include, or share hardware/software elements with, the voice over WLAN mode module 912, the WLAN radio module 914, and/or other components of the apparatus 900. The CS service support component 908 may include, or share hardware/software elements with the voice call module 916, the CS radio module 918 and/or other components of the apparatus 900.

The monitoring module 906 is configured to detect if the mobile device is or has become unable to process data for the PS service. For example, the monitoring module may detect that SIP component 910 is inoperable. This detection may include any of the example detection functionality described herein. The CS service support component 908 in this example is configured to work with the CS radio module 918 to attempt to support the CS service responsive to the monitoring module 906 detecting that the mobile device is unable to process the data for the PS service. The CS radio module 918 is configured to communicate with access networks that provide CS services. For example, the CS radio module 918 may comprise a UTRAN radio, a GERAN radio component, and/or any other radio components for communicating with an access network that provides the CS service. In this embodiment, the CS service support component 908 signals to the CS radio module 918 to attempt to register with an access network that can support the CS service if: (1) the mobile device is not currently attached to another access network that can provide the CS service; and (2) the mobile device is not already combined attached via E-UTRAN such that CSFB is possible.

The voice over WLAN mode module 912 is configured to update the mobile device's "voice over WLAN" mode of operation in accordance with the methods described herein. The WLAN radio module 914 is configured to support WLAN communications in accordance with the voice over WLAN mode module 912.

The mobile device may become unable to process data for the PS service during a voice session (using a SIP dialog). The voice call module 916 is configured to attempt a voice call using information from the previous PS voice session. Specifically, the voice call module 916, in this example, attempts the voice call using one of: a dial string that was used in establishing a Session Initiation Protocol (SIP) dialog; a dial string associated with a SIP Uniform Resource Identifier (URI); and a tel URI used when establishing the SIP dialog.

The monitoring module 906, the CS service support component 908, the PS service support component 909 (including the SIP component 910), the voice over WLAN mode module 912, the voice call module 916 and/or the CS radio module 918 may be implemented as a processor (such as the processor 902) configured to perform the functions described above. The monitoring module 906, the CS service support component 908, the PS service support component 909 (including the SIP component 910), the voice over WLAN mode module 912 the voice call module 916 and/or the CS radio module 918 may be implemented as a memory (such as the memory 904) containing instructions for execution by a processor (such as the processor 902), by hardware, or by a combination of instructions stored in a memory and additional hardware, to name a few examples. The apparatus 900 may include additional components, such as a transmitter and/or a receiver, that are not shown in FIG. 9. Not all of the elements of the apparatus 900 are required in all embodiments, and FIG. 9 is provided only as an example.

In some embodiments, rather than attempt to attach to an access network such as UTRAN, GERAN or 1XCDMA, the mobile device may attempt to register for CS services through E-UTRAN. That is, if a WLAN PS service can no longer be provided, the mobile device may attempt to register via E-UTRAN for the CS service. This registration may include a combined Tracking Area Update (TAU) procedure. If said registration is successful, the mobile device may become "combined attached" via E-UTRAN such that CSFB is available for the mobile device. The mobile device in this example may also update its "voice over WLAN" setting or generate a message to update the E-UTRAN "voice domain preference" for the mobile device.

Figure 10:
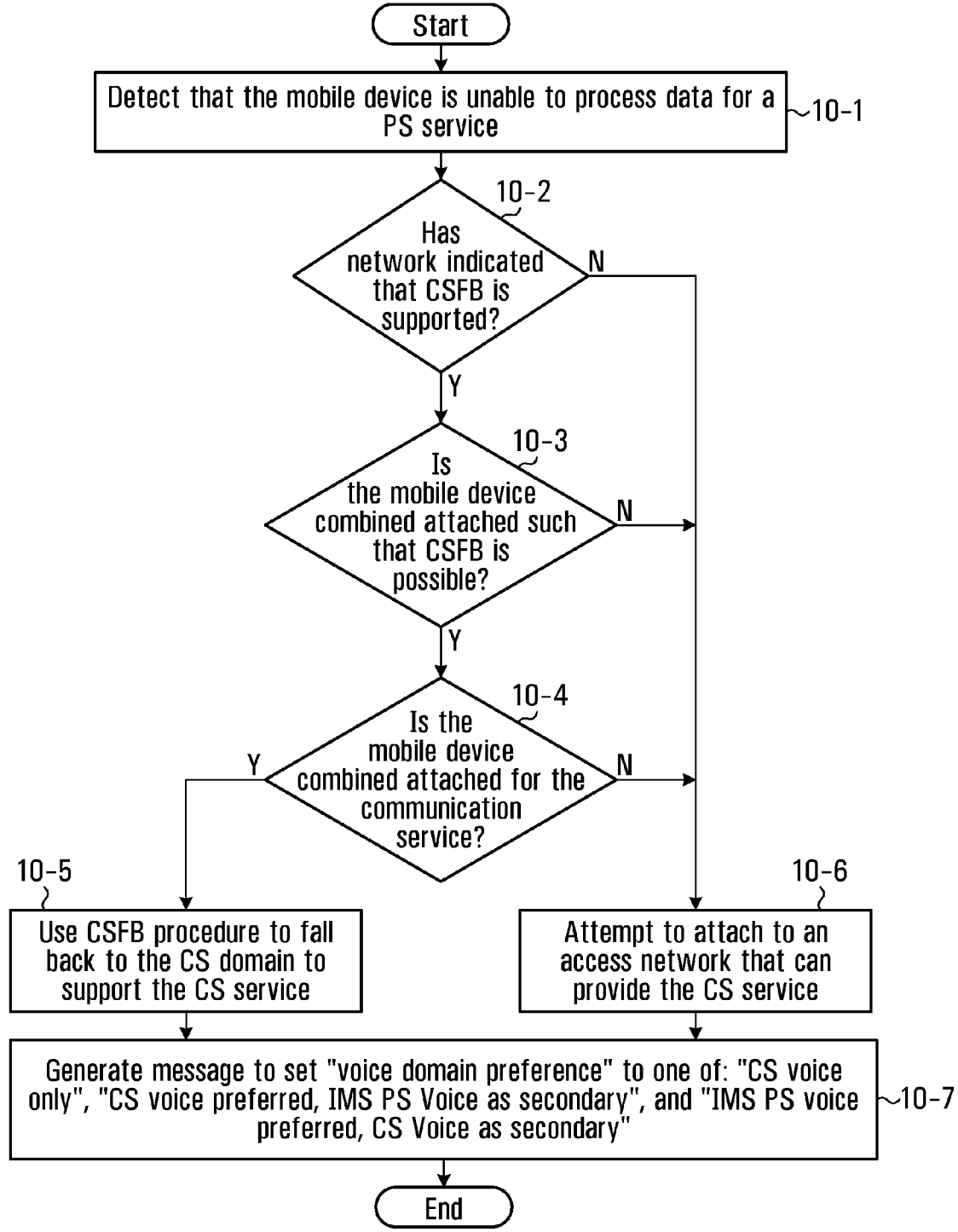
FIG. 10 shows a flowchart of an example method for supporting a communication service via E-UTRAN according to some embodiments.

FIG. 10 shows a flowchart of another example method for supporting a communication service according to some embodiments, where the communication service can be supported using a PS service or a CS service. In the example of FIG. 10, the mobile device is already attached to E-UTRAN and is registered for PS services (such as IMS PS voice). However, in other embodiments, the PS service is provided by another network such as a WLAN network. At block 10-1 of FIG. 10, the mobile device detects that it is or has become unable to process data for the PS service. This detection may include any of the specific detection functions discussed herein.

Blocks 10-2, 10-3 and 10-4 of FIG. 10 generally show an example of determining whether CSFB via E-UTRAN is currently available for supporting the CS service. However, the mobile device may already know whether CSFB is available and one or more of blocks 10-2, 10-3 and 10-4 are omitted in some embodiments. The order of blocks 10-2, 10-3 and 10-4 may be altered. Generally, if CSFB is available, then the mobile device initiates the CSFB procedure to support the CS service. Otherwise, the mobile device attempts to obtain the CS service from another access network. More specifically, at block 10-2, if the network (e.g. E-UTRAN network and/or core network) has indicated that CSFB is supported (yes branch, block 10-2), then the method continues to block 10-3. However, if the network has indicated that CSFB is not supported (no branch, block 10-2), then the method continues to block 10-6. At block 10-3, if the mobile device is combined attached such that CSFB is possible (yes branch, block 10-3), then the method continues at block 10-4. However, if the mobile device is not combined attached such that CSFB is possible (no branch, block 10-3), then the method continues at block 10-6. At block 10-4, if the mobile device is combined attached for the needed communication service (yes branch, block 10-4), then the method continues to block 10-5. However, if the mobile device is combined attached, but not for the needed communication service (no branch 10-4), then the method continues to block 10-6. At block 10-5, since it has been determined that CSFB is available, the mobile device uses CSFB procedures to fall back to the CS domain in order to support the CS service. At block 10-6, since CSFB is not available, the mobile device attempts to attach to an access network that can provide the CS service.

At block 10-7, the mobile device generates a message to change or set the "voice domain preference" of the mobile device to one of the following: "CS voice only", "CS voice preferred, IMS PS voice as secondary", and "IMS PS voice preferred, CS voice as secondary". Each of these voice domain settings may allow the option for the mobile device to support the CS service. The message may be for transmission to a network component such as a base station. In some embodiments, the preference may be set to "CS voice only". Additional information may be sent in the message regarding the status of the mobile device. In some embodiments, the message to set the voice domain setting is a Non-Access Stratum (NAS) message. It is to be understood that some other embodiments omit block 10-7. The mobile device may not send a message to set the voice domain preference. For example, the preference may already be set to one of the options set out above or may otherwise not be changed.

For a mobile device-side problem, the network may not be aware that the PS service is no longer supported. Therefore, the network may not have any reason to signal to the mobile device to change its "voice domain preference". However, the current "voice domain preference" may not allow the mobile device to use the CS service efficiently or at all. For example, the mode of operation could be set to "IMS PS voice only" when the SIP component becomes inoperable. Thus, the mobile device may actively take steps to update the "voice domain preference" by generating the message for transmission to the network as described above. This message may also provide additional information to allow the network to better deal with the mobile device's current condition.

In some embodiments, the mobile device also performs functions similar to those shown in blocks 8-3 and/or 8-4 of FIG. 8 in combination with the method of FIG. 10. Specifically, the method may also include changing a voice over WLAN setting and/or attempting a voice call as described above.

Figure 11:
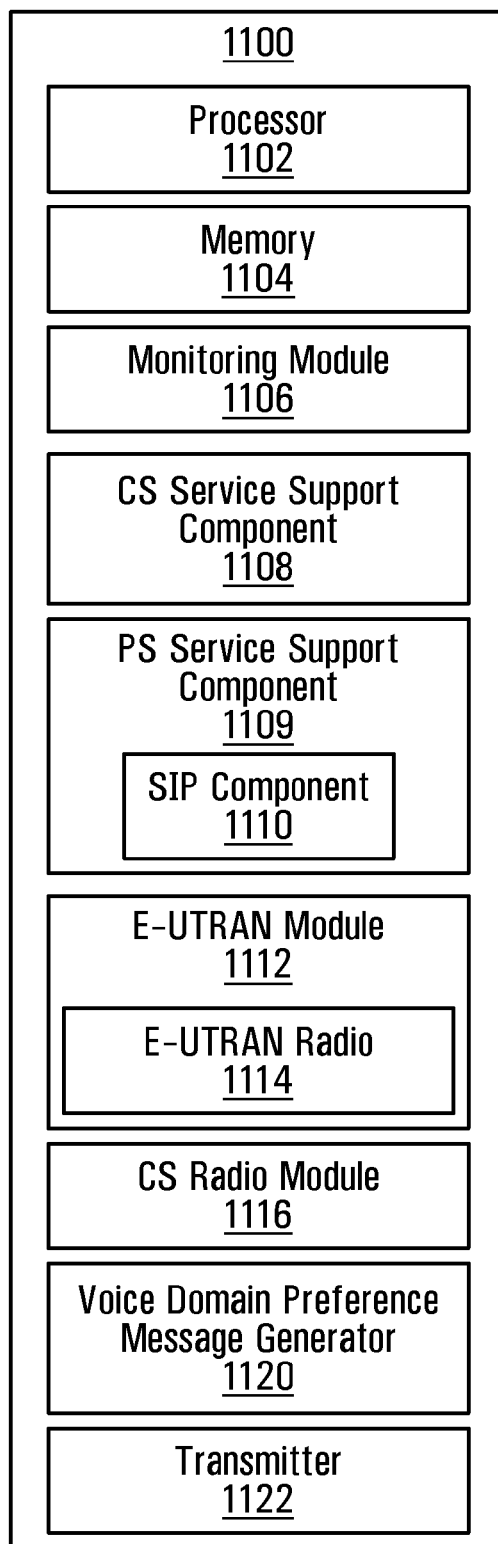
FIG. 11 shows a block diagram of an example apparatus that may implement the method of FIG. 10.

FIG. 11 shows a block diagram of an example apparatus 1100 that may implement the method of FIG. 10. The apparatus 1100 may be part of the mobile device. The apparatus 1100 includes a processor 1102, a memory 1104, a monitoring module 1106, a CS service support component 1108, a PS service support component 1109 that includes a SIP component 1110, and an E-UTRAN module 1112 including an E-UTRAN radio 1114, a CS radio module 1116, and a voice domain preference message generator 1120 and a transmitter 1122. The CS service support component 1108 is for supporting a communication service using the CS service. The PS service support component 1109 is for supporting the communication service using the PS service.

Supporting the communication service using the PS service may include processing data for the PS service. The SIP component 1110 is separate from the PS service support component 1109, or is omitted, in some embodiments. The SIP component 1110 supports the PS service, which is IMS voice in this embodiment. However, the PS service is a different service, such as a WLAN service in some embodiments. The PS service support component 1109 may include, or share elements with, the E-UTRAN module 1112, the E-UTRAN radio 1114, the voice domain preference message generator 1120, and/or other components of the apparatus 1100.

The monitoring module 1106 is configured to detect if the mobile device is or has become unable to process data for the PS service. For example, the monitoring module 1106 may detect that the SIP component 1110 is inoperable. This detection may include any of the example detection functionality described herein. The CS radio module 1116 is configured to register with access networks that provide the CS service and to support said service. The E-UTRAN module 1112 is configured to support services using the E-UTRAN via the E-UTRAN radio 1114, and employs CSFB procedures when available.

The CS service support component 1108 in this example is configured to work together with the E-UTRAN module 1112 and the CS radio module 1116 to attempt to support the CS service responsive to the monitoring module 1106 detecting that the mobile device is unable to process the data for the PS service. Specifically, if CSFB is not available, then the CS service support component 1108 signals to the CS radio module 1116 to attempt to register with an access network that can provide the CS service. The determination of whether CSFB is available may be made in accordance with the method shown in FIG. 10, for example. The CS service support component 1108 in this example also signals the E-UTRAN module 1112 to disable the E-UTRAN radio 1114 in this event. The CS radio module 1116 then camps on the Radio Access Technology (RAT) enabling the CS service.

If CSFB is available, the CS service support component 1108 signals to the E-UTRAN module 1112 to fall back to the CS domain using CSFB procedures. The voice domain preference message generator 1120 is configured to generate a message, for transmission to a network component, requesting that the voice domain preference be changed to one of: "CS voice only", "CS voice preferred, IMS PS voice as secondary", and "IMS PS voice preferred, CS voice as secondary". The message may also contain additional information indicating that IMS service is not available. The message in this embodiment is generated for transmission via the transmitter 1122.

The monitoring module 1106, the CS service support component 1108, the PS service support component 1109 (including the SIP component 1110), the E-UTRAN module 1112, the E-UTRAN radio 1114 and/or the CS radio module 1116 may be implemented as a processor (such as the processor 1102) configured to perform the functions described above. The monitoring module 1106, the CS service support component 1108, the PS service support component 1109 (including the SIP component 1110), the E-UTRAN module 1112, the E-UTRAN radio 1114 and/or the CS radio module 1116 may be implemented as a memory (such as the memory 1104) containing instructions for execution by a processor (such as the processor 1102), by hardware, or by a combination of instructions stored in a memory and additional hardware, to name a few examples.

It will also be appreciated that the apparatus 1100 may include additional components, such as a receiver, that are not shown in FIG. 11.

The E-UTRAN radio 1114 is shown as part of the E-UTRAN module 1112 in FIG. 11. However, the E-UTRAN radio 1114 may be separate from and/or external to the E-UTRAN module 1112.

A component in a mobile device supporting PS services that becomes inoperable or fails may subsequently become operable again. For example, the component may restart or recover such that PS services are once again supported. In some embodiments, the mobile device detects that the component that supports the PS service is again operable. A few examples of how this may be detected are discussed below.

A functioning SIP component may request resources from layers lower than the SIP layer. For example, the SIP component may request a Packet Data Protocol (PDP) context (e.g. when using UTRAN) or for an EPS bearer context (when using E-UTRAN). The mobile device may detect that the SIP component is requesting resources, thereby determining that the SIP component has become operable again. Other indications that the SIP component has become operable may also be detected. For example, the heartbeat message of the SIP component may again be responding as expected when the component is operable. Additionally, the SIP component may perform a registration process with other components of the mobile device when re-starting or resetting. The registration process could indicate to other elements of the mobile device that the component has become operable. In some embodiments, the SIP component may be considered to be operable when it is ready to attempt to send a SIP REGISTER request. It is to be understood that although recovery of a SIP component has been discussed, the mobile device may also detect recovery of non-SIP components using the same or similar methods, or any other suitable method.

In some embodiments, the monitoring module of the mobile device, in addition to detecting when a component is inoperable, also subsequently detects if that component has become operable again. For example, the monitoring component may indicate to the operating system (or other software components of the device) which components are being monitored by the monitoring module. Thus, when the formerly inoperable component recovers, the operating system (or other software component) may notify the monitoring component of this fact. The monitoring component may also simply detect that the component has recovered without the operating system signalling the monitoring module. For example, the monitoring module may detect a signal from the recovered component (such as a heartbeat signal) and/or detect that the component has performed a registration process. When it is detected that the mobile device cannot support an IMS PS service, the mobile device may change an internal setting "IMS voice is not available" to "true". Later, the monitoring component of the mobile device may change the setting "IMS voice is not available" to "false" in response to detecting that the PS service can again be supported. Alternatively, the recovered component itself may restore the setting "IMS voice is not available" to "false". Embodiments are not limited to the specific detection methods described herein and any suitable method for detecting operability or inoperability of a mobile device component may be employed.

In some embodiments, a component or element of the mobile device other than the monitoring module may perform the functions described in the paragraph above. For example, the functions described above may be performed in the NAS layer or another layer of the mobile device. A layer of the mobile device may be realized in software.

Figure 12:
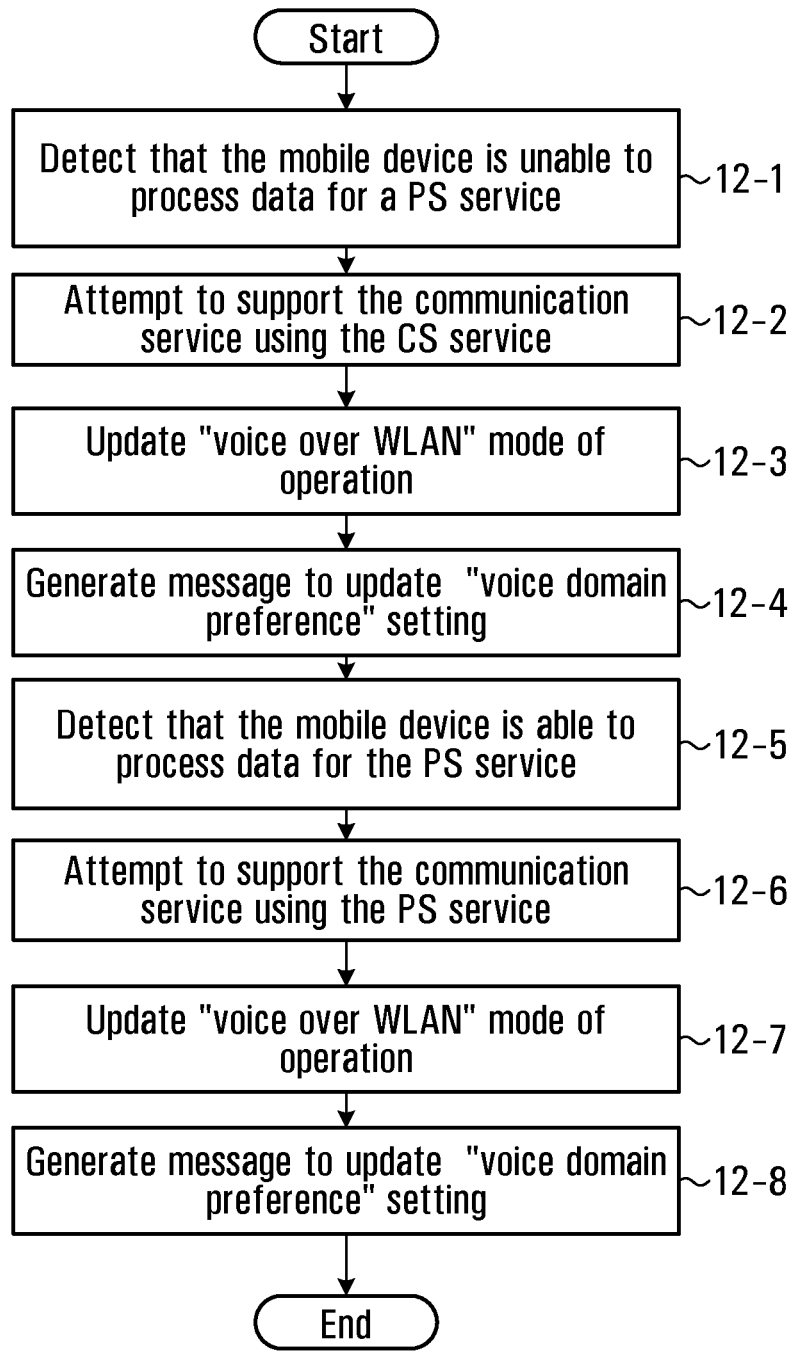
FIG. 12 shows a flowchart of another example method for supporting a communication service when a component that supports a PS service recovers according to some embodiments.

When it is detected that the PS service (i.e. the "PS-version" of the communication service) is again supported, the mobile device may attempt to support or switch back to the PS service. FIG. 12 shows a flowchart of an example method in accordance with some embodiments. At block 12-1, the mobile device detects that the mobile device cannot process data for the PS service. For example, the mobile device may detect that a SIP component is inoperable. At block 12-2, the mobile device attempts to support the CS service. The CS service may be supported using any of the methods described above. At block 12-3, the mobile device updates its "voice over WLAN" mode of operation. For example, the setting may be changed to "cellular only". At block 12-4, the mobile device generates a message to update the "voice domain preference" for E-UTRAN. For example, the message may request the preference be changed to "CS voice only". At block 12-5, the mobile device detects that it is again able to process data for the PS service. For example, the mobile device may detect that the component that supports the PS service has recovered. This detection may comprise any of the examples described above for detecting that the mobile device can again support the PS service. At block 12-6, the mobile device attempts to support the PS service. Attempting to support the PS service may include one or more of the following: (1) detaching from the access network providing the CS service (e.g. UTRAN or GERAN); (2) accepting to attach to an access network that can provide the PS service (e.g. E-UTRAN or WLAN); or (3) accepting to become combined registered/attached with E-UTRAN.

At block 12-7, the mobile device updates its "voice over WLAN" mode of operation. For example, the mobile device may change its mode of operation to "WLAN only". In some embodiments, the mobile device changes to a different mode or alternatively does not change its "voice over WLAN" mode of operation.

At block 12-8, the mobile device generates a message to update its "voice domain preference" setting. For example, the mobile device may change its voice domain preference to "IMS voice only". In some embodiments, the mobile device requests a change to a different voice domain preference or alternatively does not generate such a message.

In essence, when the component that supports the PS service has recovered, the mobile device may "undo" the changes that it made earlier in response to detecting that the component was inoperable. Thus, the mobile device may again function as it had before the component had become inoperable. The mobile device may attempt to support a different PS-version of the communication service. For example, if the mobile device had been terminating a VoIP call via WLAN when the SIP component failed, the mobile device may then initiate IMS PS voice when the SIP component recovers.

Figure 13:
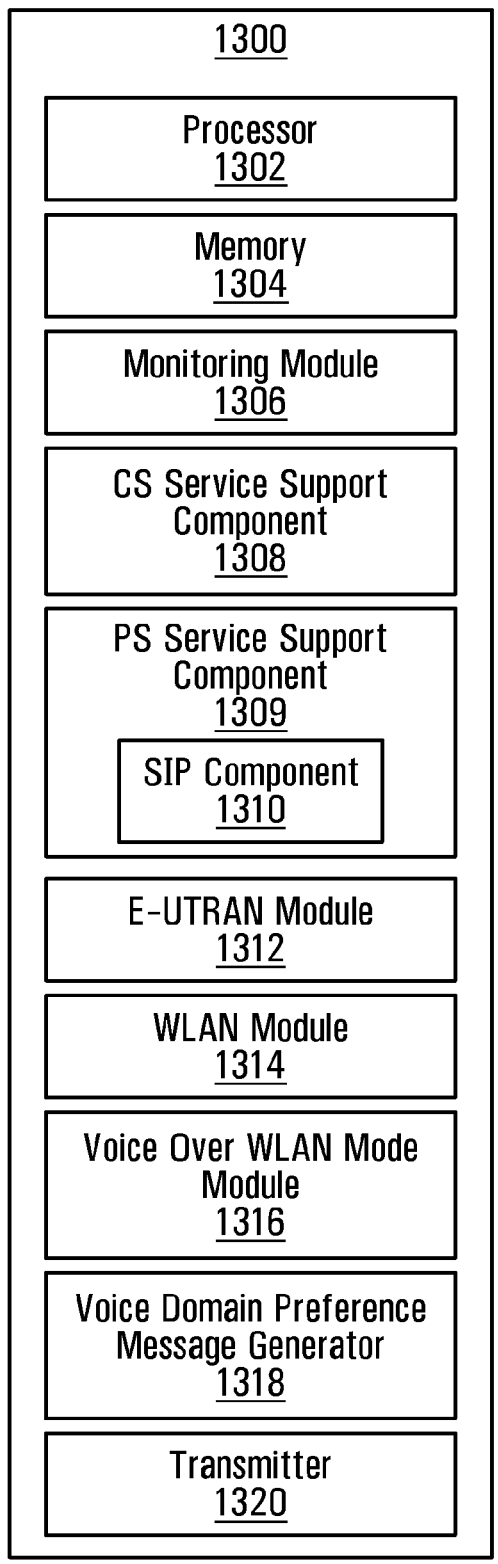
FIG. 13 shows a block diagram of an example apparatus that may implement the method of FIG. 12.

FIG. 13 shows a block diagram of a of an example apparatus 1300 that may implement the method of FIG. 12. The apparatus 1300 may be part of the mobile device. The apparatus 1300 includes a processor 1302, a memory 1304, a monitoring module 1306, a CS service support component 1308, a PS service support component 1309 including a SIP component 1310, an E-UTRAN module 1312, a WLAN module 1314, a voice over WLAN mode module 1316, a voice domain preference message generator 1318 and a transmitter 1320. The CS service support component 1308 is for supporting a communication service using the CS service. The PS service support component 1309 is for supporting the communication service using the PS service. Supporting the communication service using the PS service may include processing data for the PS service. The SIP component 1310 is separate from the PS service support component 1309, or is omitted, in some embodiments. The SIP component 1310 supports both WLAN and 3GPP PS services in this example. The monitoring module 1306 is configured to detect if the mobile device is or has become unable to process data for the PS service. For example, the monitoring module 1306 may detect that SIP component 1310 is inoperable. The CS service support component 1308 attempts to support the CS service responsive to the monitoring module 1306 detecting that the mobile device is unable to process the data for the PS service. The monitoring module 1306 is also configured to detect if the SIP component 1310 becomes operable again. These functions of the monitoring module 1306 may include any of the example detection functionality described herein. The CS service support component 1308 is configured to work with the E-UTRAN module 1312, the WLAN module 1314, the voice over WLAN mode module 1316, and the voice domain preference message generator 1318 to attempt to support the CS service.

The PS service support component 1309 is configured to work with the E-UTRAN module 1312, the WLAN module 1314, the voice over WLAN mode module 1316, and the voice domain preference message generator 1318 to attempt to support the CS service responsive to the monitoring module 1306 determining that the mobile device is again able to process data for the PS service. For example, the monitoring module 1306 may detect that the SIP component 1310 has recovered and is operable. For example, the PS service support component 1309 may signal to the E-UTRAN module 1312 to attempt to register for the PS service. Alternatively, the PS service support component 1309 may signal to the to the WLAN module 1314 to attempt to obtain the PS service. The PS service support component 1309 may also signal to the voice over WLAN mode module 1316 and the voice domain preference message generator 1318 to initiate the process of updating either or both of the voice domain preference for E-UTRAN and the voice over WLAN setting for the mobile device as described herein. The PS service support component 1309 may include, or share elements with, the E-UTRAN module 1312, the WLAN module 1314, the voice over WLAN mode module 1316, the voice domain preference message generator 1318, and/or other components of the apparatus 1300.

The monitoring module 1306, the CS service support component 1308, the PS service support component 1309, the SIP component 1310, the E-UTRAN module 1312, the WLAN module 1314, the voice over WLAN mode module 1316 and/or the voice domain preference message generator 1318 may be implemented as a processor (such as the processor 1302) configured to perform the functions described above. The monitoring module 1306, the CS service support component 1308, the PS service support component 1309, the SIP component 1310, the E-UTRAN module 1312, the WLAN module 1314, the voice over WLAN mode module 1316 and/or the voice domain preference message generator 1318 may be implemented as a memory (such as the memory 1304) containing instructions for execution by a processor (such as the processor 1302), by hardware, or by a combination of instructions stored in a memory and additional hardware, to name a few examples.

It will also be appreciated that the apparatus 1300 may include additional components, such as a receiver, that are not shown in FIG. 13.

If the component has recovered, the mobile device may send a SIP REGISTER request as part of initiating a SIP REGISTRATION procedure. The SIP REGISTER request may be sent if the IP address of the mobile device is different from a previous IP address that was use just prior to detecting the failure or if the mobile device has reasons to assume it has been deregistered at the SIP REGISTRAR (e.g. due to timers having expired).

If the component (at the mobile device) recovered or restarted or became operable, the mobile device may determine that its Public User Identity is successfully registered with the REGISTRAR (e.g. after receiving an SIP 200 OK response to the SIP REGISTER request or after receiving a SIP NOTIFY request). In some embodiments, the mobile device then detaches from UTRAN or GERAN. In some embodiments, the mobile device accepts being registered for EPS services only at the E-UTRAN. In some embodiments, the mobile device may accept being combined registered for SMS-only at the E-UTRAN (for example if the PS service that can again be supported at the mobile device is a voice service).

If the communication service is a voice service, and a CS voice call is ongoing when the component supporting the PS voice service recovers, the mobile device may wait until the CS voice call is finished before switching over to the PS voice service. In some embodiments, when the CS voice call has ended, the mobile device may re-enable E-UTRA radio capabilities or WLAN capabilities. When the mobile device determines its Public User Identity is successfully registered with the REGISTRAR, the Non Access Stratum (NAS) or the monitoring module may set the "IMS voice not available" setting to false.

Figure 14:
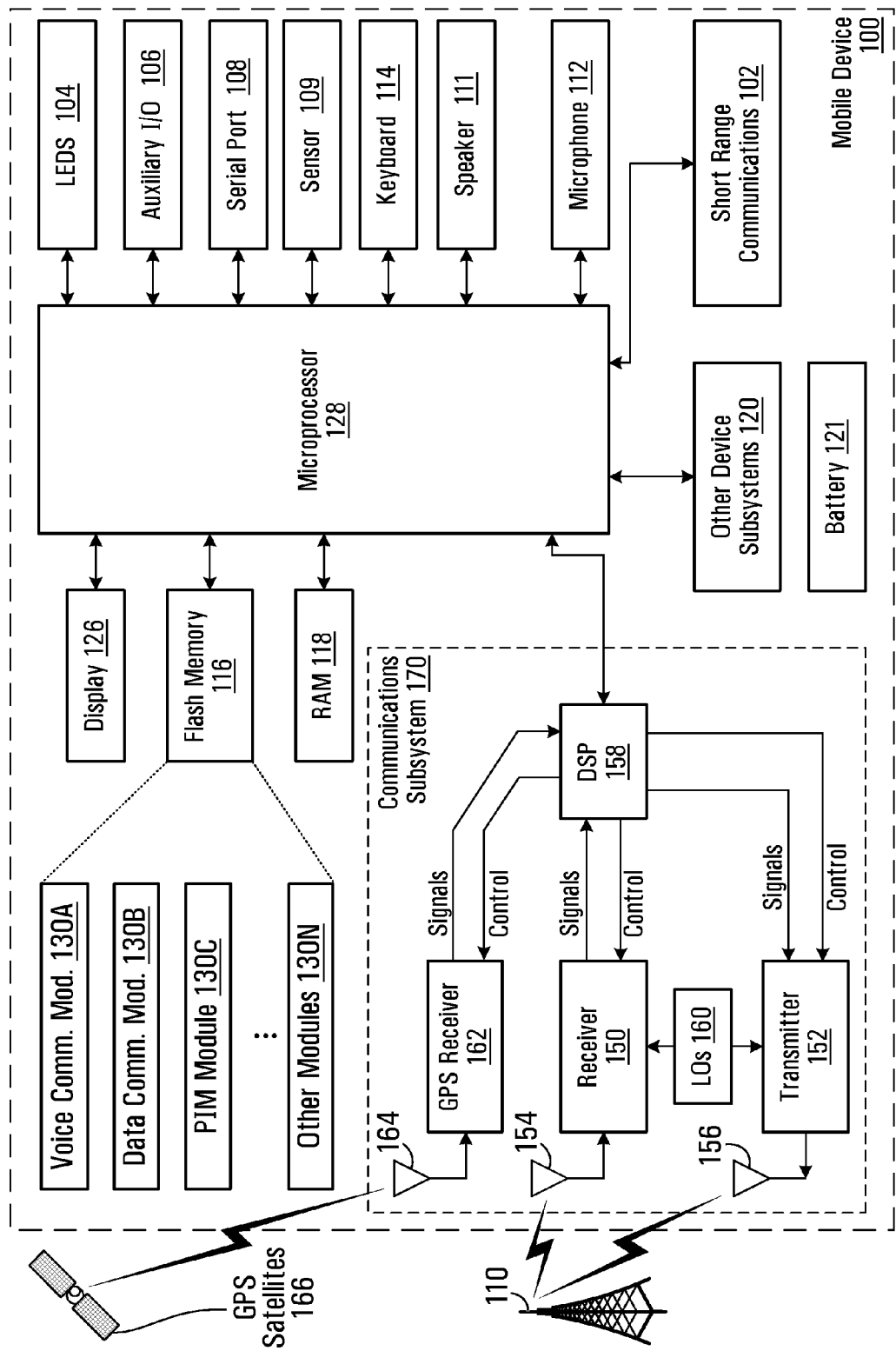
FIG. 14 shows block diagram of a mobile device that may implement the methods described herein.

FIG. 14 shows block diagram of a mobile device 100 that may implement the methods described herein. The mobile device 100 is shown with specific components for implementing features similar to those of the apparatuses 200, 400, 700, 900, 1100 and 1300 shown in FIGS. 2, 4, 7, 9, 11 and 13 respectively. It is to be understood that the mobile device 100 is shown with very specific details for example purposes only.

The mobile device 100 has a housing that may be elongated vertically, or may take on other sizes and shapes (including clamshell housing structures). The keyboard 114 may include a mode selection key, or other hardware or software for switching between text entry and telephony entry. Alternatively, the mobile device 100 may have a housing that does not take on other sizes and shapes.

A microprocessor 128 is shown schematically as coupled between a keyboard 114 and a display 126. The microprocessor 128 is a type of processor with features similar to those of the processors 202, 402, 702, 902, 1102 and 1302 of the apparatuses 200, 400, 700, 900, 1100 and 1300 shown in FIGS. 2, 4, 7, 9, 11 and 13 respectively. The microprocessor 128 controls operation of the display 126, as well as overall operation of the mobile device 100, in response to actuation of keys on the keyboard 114 by a user.

In addition to the microprocessor 128, other parts of the mobile device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The mobile device 100 may have a battery 121 to power the active elements of the mobile device 100. The mobile device 100 is in some example embodiments a two-way radio frequency (RF) communication device having voice and data communication capabilities. In addition, the mobile device 100 in some example embodiments has the capability to communicate with other computer systems via the Internet.

Operating system software executed by the microprocessor 128 is in some example embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device 100 may also be stored to the RAM 118.

The microprocessor 128, in addition to its operating system functions, enables execution of software applications on the mobile device 100. A predetermined set of software applications that control basic device operations, such as a voice communications module 130A and a data communications module 130B, may be installed on the mobile device 100 during manufacture. In addition, a personal information manager (PIM) application module 130C may also be installed on the mobile device 100 during manufacture. The PIM application is in some example embodiments capable of organizing and managing data items, such as e-mail, calendar events, voice mails, appointments, and task items. The PIM application is also in some example embodiments capable of sending and receiving data items via a wireless network 110. In some example embodiments, the data items managed by the PIM application are seamlessly integrated, synchronized and updated via the wireless network 110 with the device user's corresponding data items stored or associated with a host computer system.

Additional software modules, illustrated as another software module 130N, may be installed during manufacture. The software modules may include, for example, the monitoring module 206, 406, 706, 906, 1106 or 1306, the CS service support component 208, 408, 708, 908, 1108 or 1308, the PS service support component 209, 409, 709, 909, 1109 or 1309, the SIP component 410, 710, 910, 1110 or 1310, the heartbeat message monitor 712, the SIP error detector 714, the voice over WLAN mode module 912 or 1316, the WLAN radio module 914, a voice call module 916, the CS radio module 918 or 1116, the E-UTRAN module 1112 or 1312, the E-UTRAN radio 1114, a CS radio 1116, the voice domain preference message generator 1120 or 1318 and/or the WLAN module 1314 of FIGS. 2, 4, 7, 9, 11 and 13. Note that the implementations described with reference to FIG. 14 are very specific for example purposes. For example, alternative implementations are possible in which the information updater is not implemented as software and stored on the flash memory 116. More generally, the information updater may be implemented as software, hardware, firmware, or any appropriate combination thereof.

Communication functions, including data and voice communications, are performed through the communications subsystem 170, and possibly through the short-range communications subsystem 102. The communications subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communications subsystem 170 is dependent upon the communication network in which the mobile device 100 is intended to operate. For example, the communications subsystem 170 of the mobile device 100 may be designed to operate with the Mobitex™ DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 170 may also be designed to operate with an 802.11 Wi-Fi network, or an 802.16 WiMAX network or both. Other types of data and voice networks, both separate and integrated, may also be utilized with the mobile device 100.

Network access may vary depending upon the type of communication system. For example, in the Mobitex™ and DataTAC™ networks, mobile devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the mobile device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using at least one of the keyboard 114 and some other auxiliary I/O device 106, such as a touchpad, a rocker switch, a thumb-wheel, or some other type of input device. The composed data items may then be transmitted over the communication network 110 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the mobile device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are omitted for simplicity.

The short-range communications subsystem 102 enables communication between the mobile device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

According to some aspects, a computer-readable medium is provided having computer-executable instructions stored thereon that, when executed, cause a computer to implement any one of the methods described herein.

The methods described herein are provided as examples. The various functions of blocks of the method flowcharts shown in the figures and described above may be performed in different orders than described above. Furthermore, in some example embodiments, various blocks of the methods described above may be omitted.

What has been described is merely illustrative of the application of the principles of the disclosure. Other arrangements and methods can be implemented by those skilled in the art without departing from the spirit and scope of the present disclosure.

The invention claimed is:

1. A method in a mobile device comprising:
   in respect of a communication service that can be supported using a Packet Switched (PS) service or a Circuit Switched (CS) service:
   detecting that the mobile device is unable to process data for the PS service;
   in response to detecting that the mobile device is unable to process data for the PS service, attempting to support the communication service using the CS service;
   wherein detecting that the mobile device is unable to process the data for the PS service comprises detecting that a component of the mobile device that supports the communication service using the PS service is inoperable;
   wherein detecting that the component of the mobile device that supports the communication service using the PS service is inoperable comprises at least one of:
   monitoring a heartbeat message for the component of the mobile device; and
   monitoring for a signal that indicates failure of the component of the mobile device.

2. The method of claim 1, wherein the communication service is one of: a voice service; a text message service; a data service; and a video service.

3. The method of claim 1, wherein the component that supports the communication service using the PS service comprises an Internet Protocol (IP) Multimedia Core Network Subsystem (IMS) component.

4. The method of claim 1, wherein the component that supports the communication service using the PS service comprises a Session Initiation Protocol (SIP) component.

5. The method of claim 1, wherein detecting that the mobile device is unable to support the communication service using the PS service comprises at least one of:
   determining that a time in which the heartbeat message for the component has not been received exceeds a threshold; and
   detecting the signal that indicates failure of the component.

6. The method of claim 1, wherein said component that supports the communication service using the PS service registers component information, the component information indicating that said component supports the communication service using the PS service.

7. The method of claim 1, further comprising: detecting that the component that supports the PS service has recovered; and attempting to support the communication service using the PS service.

8. The method of claim 1, wherein attempting to support the communication service using the CS service comprises attempting to register with an access network that can provide the CS service.

9. The method of claim 8, wherein attempting to register with the access network that can provide the CS service comprises attempting to register with the access network that can provide the CS service if CS Fallback via an Evolved Universal Terrestrial Radio Access Network (E-UTRAN) is not currently available.

10. The method of claim 1, wherein attempting to support the CS service for the mobile device comprises performing a CS Fallback procedure via an Evolved Universal Terrestrial Radio Access Network (E-UTRAN).

11. The method of claim 1, further comprising generating a message for transmission to set a voice domain preference for the mobile device to one of: CS voice only; CS voice preferred, Internet Protocol (IP) Multimedia Core Network Subsystem (IMS) PS voice as secondary; and IMS PS voice preferred, CS voice as secondary.

12. The method of claim 1, further comprising setting a voice over WLAN mode of operation of the mobile device to one of: cellular only; cellular preferred; and WLAN preferred.

13. The method of claim 1, wherein the communication service is a voice service, and the method further comprises attempting a voice call using one of: a dial string that was used in establishing a Session Initiation Protocol (SIP) dialog; a dial string associated with a SIP Uniform Resource Identifier (URI); and a telephone (tel) URI used when establishing the SIP dialog.

14. An apparatus in a mobile device comprising:
   a Packet Switched (PS) service support component for supporting a communication service using a PS service;
   a Circuit Switched (CS) service support component for supporting the communication service using a CS service; and
   a monitoring module that is configured to detect that the mobile device is unable to process data for the PS service, wherein
   the CS service support component attempts to support the communication service using the CS service in response to the monitoring module detecting that the mobile device is unable to process the data for the PS service;
   wherein the monitoring module is configured to detect that the mobile device is unable to process the data for the PS service by detecting that the PS service support component of the apparatus is inoperable;
   wherein, to detect that the PS service support component of the apparatus is inoperable, the monitoring module comprises at least one of:
   a heartbeat message monitor for monitoring a heartbeat message for the PS service support component of the apparatus; and
   an error detector for detecting a signal that indicates failure of the PS service support component of the apparatus.

15. The apparatus of claim 14, wherein the PS service support component comprises one of or both: an Internet Protocol (IP) Multimedia Core Network Subsystem (IMS) component; and a Session Initiation Protocol (SIP) component.

16. The apparatus of claim 14, wherein the monitoring module determines that the mobile device is unable to process the data for the PS service if:
   a time in which the heartbeat message for the PS service support component has not been received exceeding a threshold; or
   the signal that indicates the failure of the PS service support component is detected.

17. The apparatus of claim 14, wherein the CS service support component is configured to attempt to support the CS service for the mobile device by attempting to attach to an access network that can provide the CS service.

18. The apparatus of claim 14, wherein the CS service support component is configured to attempt to support the CS service for the mobile device by initiating a CS Fallback procedure via an Evolved Universal Terrestrial Radio Access Network (E-UTRAN).

19. The apparatus of claim 14, further comprising:
   a transmitter for transmitting a message to set a voice domain preference for the mobile device to one of: CS voice only; CS voice preferred, Internet Protocol (IP) Multimedia Core Network Subsystem (IMS) PS Voice as secondary; and IMS PS voice preferred, CS Voice as secondary; and
   a WLAN module for setting a voice over WLAN mode of operation of the mobile device to one of: cellular only; cellular preferred; and WLAN preferred.

20. A non-transitory computer-readable storage medium having computer-executable instructions stored thereon that, when executed by a computer, cause the computer to implement the method of any one of claims 1 to 13.

* * * * *